United States Patent [19]

Hamm et al.

[11] 3,929,450

[45] Dec. 30, 1975

[54] HERBICIDAL COMPOSITIONS AND METHODS

[75] Inventors: Philip C. Hamm, Glendale; David E. Schafer, St. Louis County, both of Mo.

[73] Assignee: Monsanto Company, St. Louis, Mo.

[22] Filed: June 28, 1974

[21] Appl. No.: 484,053

[52] U.S. Cl. .................................................. 71/86
[51] Int. Cl.² ........................................... A01N 9/36
[58] Field of Search .......................................... 71/86

[56] References Cited
UNITED STATES PATENTS 3,799,758  3/1974  Franz ....................................... 71/86
3,837,834  9/1974  Hill et al. ................................ 71/86

*Primary Examiner*—Glennon H. Hollrah
*Attorney, Agent, or Firm*—William T. Black; Donald W. Peterson

[57] ABSTRACT

It has been found that the herbicidal activity of N-phosphonomethyl glycine and its monoesters and salts can be synergistically increased by combining with an aliphatic phosphonic acid or phosphonate.

15 Claims, No Drawings

HERBICIDAL COMPOSITIONS AND METHODS

This invention relates to synergistic herbicidal combinations, compositions and methods. More particularly, this invention relates to synergistic herbicidal combinations comprising N-phosphonomethyl glycine and the monoester and salt derivatives thereof and an aliphatic phosphonic acid or phosphonate.

N-phosphonomethyl glycine and its derivatives are known to possess good contact herbicidal activity. These compounds are particularly effective in the control of perennial plants, U.S. Pat. No. 3,799,758.

In accordance with the instant invention, when an N-phosphonomethyl glycine of the formula

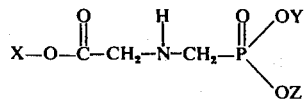

wherein X is hydrogen, lower alkyl, lower alkoxyalkyl, lower alkoxyalkoxyalkyl or a salt-forming cation selected from the group consisting of alkali metals, alkaline earth metals, ammonia and organic amines having a molecular weight below about 300 Y and Z are hydrogen, or a salt-forming cation such as described for X and is employed in combination with a phosphonate compound of the formula

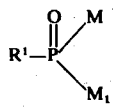

wherein $R^1$ is an aliphatic hydrocarbon radical of from 1 to 20 carbon atoms or such a radical substituted with chlorine, hydroxy or an alkylphenyl group and M and $M_1$ are each hydroxy, chlorine, the same or different lower alkoxy or an alkali metal oxy group, the herbicidal activity of the N-phosphonyl glycine is substantially increased although the phosphonate itself possesses little or no herbicidal properties.

In employing the herbicidal combinations of this invention, one can either combine the materials in a common solvent system and spray a mixture on to the plants which it is desired to be controlled. As an alternative method, the phosphonate is dissolved in a solvent and sprayed on to the plants and then substantially simultaneously, but sequentially, a water or solvent solution of the N-phosphonomethyl glycine is sprayed on to the plates.

The synergistic effect of the phosphonic acid compound on N-phosphonomethyl glycine and its derivatives has been observed to be present at ratios of 64 to 1 to 1 to 4. It is preferred to employ ratios of the phosphonic acid to glycine of from 1 to 4 to 4 to 1. For economic reasons, it is preferred to employ the phosphonic acid and the N-phosphonomethyl glycine or derivatives at a rate of from 0.56 to 11.2 kg per hectare although amounts up to about 30 pounds per acre may be employed on the harder to kill undesirable plant species.

The term "alkali-metal" encompasses lithium, sodium, potassium, cesium and rubidium; and the term "alkaline earth metal" includes beryllium, magnesium, calcium, strontium and barium.

The organic ammonium salts of the N-phosphonomethyl glycine are those prepared from low molecular weight organic amines, i.e. having a molecular weight below about 300, and such organic amines include the alkyl amines, alkylene amines and alkanol amines containing not more than 2 amine groups, such as methylamine, ethylamine, n-propylamine, isopropylamine, n-butylamine, isobutylamine, sec-butylamine, n-amylamine, isoamylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, methylethylamine, methylisopropylamine, methylhexylamine, methylnonylamine, methylpentadecylamine, methyloctadecylamine, ethylbutylamine, ethylheptylamine, ethyloctylamine, hexylheptylamine, hexyloctylamine, dimethylamine, diethylamine, di-n-propylamine, diisopropylamine, di-n-amylamine, diisoamylamine, dihexylamine, di-heptylamine, dioctylamine, trimethylamine, triethylamine, tri-n-propylamine, triisopropylamine, tri-n-butylamine, triisobutylamine, tri-sec-butylamine, tri-n-amylamine, ethanolamine, n-propanolamine, isopropanolamine, diethanolamine, N,N-diethylethanolamine, N-ethylpropanolamine, N-butylethanolamine, allylamine, n-butenyl-2-amine, n-pentenyl-2-amine, 2,3-dimethylbutenyl-2-amine, di-butenyl-2-amine, n-hexenyl-2-amine and propylenediamine, primary aryl amines such as aniline, methoxyaniline, ethoxyaniline, o,m,p-toluidine, phenylenediamine, 2,4,6-tribromoaniline, benzidine, naphthylamine, o,m,p-chloroaniline, and the like; hetrocyclic amines such as pyridine, morpholine, piperidine, pyrrolidine, indoline, azepine and the like.

The term "lower alkoxyalkyl" as employed herein and as represented by X is the above formula, includes alkoxyalkyl, alkoxyalkoxyalkyl and dialkoxyalkyl groups such as, for example, methoxyethyl, ethoxyethyl, ethoxybutyl, propoxybutyl, methoxyethoxyethyl, methoxyethoxypropyl, 2,3-diethoxypropyl, 2,3-dipropoxybutyl and the like. These compounds are prepared by esterifying the free acid with the proper alcohol employing an acid catalyst such as HCl.

Illustrative of the groups represented by $R^1$ are alkyl, alkenyl and alkynyl groups and such groups substituted with phenyl groups. The groups include, for example, methyl, ethyl, propyl, isopropyl, hexyl, decyl, dodecyl, octadecyl, eicosyl and their isomers, ethenyl, propenyl, octadecynyl, undecynyl, octenyl and the like, propargyl, 4-octadecynyl, 3-undecynyl and the like, benzyl, dodecylbenzyl, phenylethyl and the like.

Illustrative of the N-phosphonomethyl glycine derivative which are useful in the instant invention are:

Mono(pyridine) salt of N-phosphonomethyl glycine
Mono(aniline) salt of N-phosphonomethyl glycine
Bis(N-phosphonomethyl glycine) hydrochloride hydrate
Mono(isopropylamine) salt of N-phosphonomethyl glycine
Mono(n-butylamine) salt of N-phosphonomethyl glycine
Sodium N-phosphonomethyl glycinate
Disodium N-phosphonomethyl glycinate
Trisodium N-phosphonomethyl glycinate
N-Phosphonomethyl glycine, mono-ethanolamine salt
N-Phosphonomethyl glycine, mono-ammonium salt of N-phosphonomethyl glycine
Magnesium salt of N-phosphonomethyl glycinate Potassium salt of N-phosphonomethyl glycine
Dimethylamine salt of N-phosphonomethyl glycine
Dilithium salt of N-phosphonomethyl glycine
N-Phosphonomethyl glycinamide
Methyl-N-(phosphonomethyl)glycinate
Ethyl-N-(phosphonomethyl)glycinate
n-propyl-N-(phosphonomethyl)glycinate
n-butyl-N-(phosphonomethyl)glycinate
Mono(methylamine) salt of N-phosphonomethyl glycine
Mono(diisopropylamine) salt of N-phosphonomethyl glycine
Mono(diethanolamine) salt of N-phosphonomethyl glycine
Mono(triethylamine) salt of N-phosphonomethyl glycine
Monopyridine salt of N-phosphonomethyl glycine
Mono-(trimethylamine) salt of N-phosphonomethyl glycine
Mono(diethylenetriamine) salt of N-phosphonomethyl glycine
Mono-n-propylamine salt of N-phosphonomethyl glycine
Monomorpholine salt of N-phosphonomethyl glycine
Mono(dipropargylamine) salt of N-phosphonomethyl glycine
Monosodium salt of ethyl N-phosphonomethyl glycinate
Potassium salt of ethyl N-phosphonomethyl glycinate
Mono(diallylamine) salt of N-phosphonomethyl glycine
Monosodium salt of propyl-N-phosphonomethyl glycinate
Monosodium salt of methyl-N-phosphonomethyl glycinate
Monopotassium salt of methyl-N-phosphonomethyl glycinate Monopotassium salt of propyl-N-phosphonomethyl glycinate
Monopotassium salt of butyl-N-phosphonomethyl glycinate
Monocyclohexylamine salt of N-phosphonomethyl glycine
Di(methylamine) salt of N-phosphonomethyl glycine
Di(dimethylamine) salt of N-phosphonomethyl glycine
Di(ethylamine) salt of N-phosphonomethyl glycine
Di(N-propylamine) salt of N-phosphonomethyl glycine
Di(iso-propylamine) salt of N-phosphonomethyl glycine
Mono(steaylamine) salt of N-phosphonomethyl glycine
Mono(methylbutylamine) salt of N-phosphonomethyl glycine
Methoxyethyl-N-phosphonomethyl glycinate The following Examples serve to further illustrate the invention, all parts being parts by weight unless otherwise expressly set forth.

EXAMPLE 1

A series of post-emergent herbicidal tests were conducted in the following manner. Seeds of soybeans, cotton, velvetleaf, wheat, morningglory and wild oats planted in soil which had previously been sterilized with methylbromide and contained in aluminum pans having holes in the bottom. The pans were then placed in a greenhouse and watered and the seeds allowed to germinate for approximately 3 weeks. At this time, the plants had grown to the following stages:

| Soybeans | (SB) | 1½ trifoliolate |
| Cotton | (CO) | 1 leaf |
| Velvetleaf | (VL) | 2 leaf |
| Wheat | (WH) | 3 to 4 leaf |
| Morningglory | (MG) | 2 leaf |
| Wild Oats | (WO) | 2 to 3 leaf |

The plants were treated sequentially. First, the potentiator (Compounds I – VII) was applied in a water-acetone solution at a rate equal to 0.28 kg. per hectare (ha) and then the N-phosphonomethyl glycine isopropylamine salt at three different rates (0.07, 0.14 and 0.28 kg/ha). The plants were then returned to the greenhouse and maintained under growing conditions. The plant observation was made 22 days later. The results, in percent inhibition, are given in Table I.

TABLE I

| Compound | Rate kg/ha | SB | CO | VL | WH | MG | WO |
|---|---|---|---|---|---|---|---|
| A | .07 | 0 | 20 | 3 | 0 | 20 | 0 |
|  | .28 | 10 | 63 | 75 | 18 | 45 | 8 |
|  | 1.12 | 28 | 80 | 98 | 63 | 93 | 33 |
| I | — | 0 | 0 | 0 | 5 | 0 | 0 |
| A+I | .07A | 30 | 30 | 70 | 50 | 45 | 25 |
|  | .28A | 45 | 65 | 95 | 90 | 60 | 75 |
|  | 1.12A | 100 | 100 | 100 | 100 | 100 | 95 |
| II | — | 10 | 15 | 0 | 0 | 10 | 0 |
| A+II | .07A | 10 | 10 | 85 | 15 | 45 | 10 |
|  | .28A | 25 | 70 | 90 | 80 | 60 | 70 |
|  | 1.12A | 80 | 85 | 90 | 90 | 90 | 65 |
| III | — | 0 | 0 | 0 | 0 | 0 | 0 |
| A+III | .07A | 0 | 30 | 65 | 10 | 40 | 15 |
|  | .28A | 45 | 80 | 85 | 70 | 65 | 35 |
|  | 1.12A | 95 | 90 | 100 | 95 | 90 | 85 |
| IV | — | 0 | 0 | 0 | 0 | 0 | 0 |
| A+IV | .07A | 0 | 15 | 10 | 10 | 35 | 5 |
|  | .28A | 10 | 65 | 80 | 50 | 55 | 40 |
|  | 1.12A | 55 | 95 | 100 | 75 | 90 | 45 |
| V | — | 0 | 0 | 0 | 0 | 0 | 0 |
| A+V | .07A | 0 | 40 | 30 | 10 | 25 | 0 |
|  | .28A | 30 | 65 | 95 | 40 | 45 | 60 |
|  | 1.12A | 100 | 90 | 100 | 65 | 80 | 75 |
| VI | — | 0 | 0 | 0 | 0 | 0 | 0 |
| A+VI | .07A | 0 | 0 | 5 | 10 | 45 | 15 |
|  | .28A | 20 | 55 | 95 | 75 | 40 | 40 |
|  | 1.12A | 65 | 70 | 95 | 75 | 65 | 80 |
| VII | — | 5 | 5 | 0 | 0 | 0 | 0 |
| A+VII | .07A | 5 | 20 | 95 | 15 | 40 | 25 |

TABLE I-continued

| Compound | Rate kg/ha | SB | CO | VL | WH | MG | WO |
|---|---|---|---|---|---|---|---|
| | .28A | 30 | 60 | 90 | 60 | 55 | 30 |
| | 1.12A | 80 | 90 | 100 | 90 | 80 | 85 |

A = N-phosphonomethyl glycine, isopropyl ammonium salt
I = 2-chlorododecylphosphonic acid
II = 1-decanephosphonic acid
III = 1-tetradecanephosphonic acid
IV = 1-hexadecanephosphonic acid
V = dodecylphosphonic acid
VI = didecyl(chloromethyl)phosphonate
VII = dioctyl(chloromethyl)phosphonate

EXAMPLE 2

Following the procedure of Example 1 but employing a different plant spectrum, 2-chlorododecylphosphonic acid (II) and 1-hydroxy-1-methyldodecylphosphonic acid (VIII) were tested as synergists for N-phosphonomethyl glycine, isopropyl ammonium salt (A) with the results shown in Table II. The synergists were employed at 0.56 kg/ha in all combination treatments.

Plant growth stage at time of treatment:

| Corn | (CO) | 3 → 4 leaf |
|---|---|---|
| Sorghum | (SO) | 3 leaf |
| Wheat | (WH) | 2 → 3 leaf |
| Sugar beets | (SB) | ½ → 1 pair leaves |
| Green foxtail | (FT) | 2 leaf |
| Crabgrass | (CG) | 2 leaf |
| Yellow nutsedge | (NS) | 3 → 5 leaf |
| Lambsquarters | (LQ) | 2 leaf |
| Smartweed | (SW) | 1 leaf |

EXAMPLE 3

Following the procedure of Example 1 but employing a different spectrum of plants, the following compounds were tested as synergists at 2.24 kg/ha for varying rates of N-phosphonomethyl glycine, isopropylammonium salt (A):

IX Decyl phosphorodichloridate
X Dodecyl-phosphorodichloridate
I 2-chlorododecylphosphonic acid
VIII 1-hydroxy-1-methyldodecylphosphonic acid
XI 1-hydroxydodecylphosphonic acid Plant growth stage at time of treatment:

| Soybeans | 1½ trifoliolate |
|---|---|
| Cotton | 1 → 1½ leaf |
| Velvetleaf | 2 → 2½ leaf |
| Barnyard grass | 3 leaf |
| Morningglory | 2 → 2½ leaf |
| Rice | 2 leaf |

The results are shown in Table III.

TABLE III

| Compound | Rate kg/ha | Soybean | Cotton | Velvetleaf | Barnyard grass | Morningglory | Rice |
|---|---|---|---|---|---|---|---|
| A | .14 | 3 | 25 | 15 | 5 | 53 | 8 |
| | 1.12 | 48 | 80 | 88 | 88 | 88 | 60 |
| IX | — | 0 | 0 | 0 | 0 | 0 | 0 |
| A+IX | .14A | 20 | 45 | 45 | 40 | 60 | 90 |
| | 1.12A | 95 | 100 | 95 | 95 | 95 | 80 |
| X | — | 15 | 0 | 0 | 0 | 0 | 0 |
| A+X | .14A | 25 | 30 | 10 | 35 | 45 | 0 |
| | 1.12A | 100 | 90 | 100 | 95 | 90 | 70 |
| I | — | 0 | 0 | 0 | 25 | 0 | 25 |
| A+I | .14A | 80 | 80 | 50 | 100 | 75 | 100 |
| | 1.12A | 95 | 100 | 100 | 100 | 90 | 100 |
| VIII | — | 0 | 0 | 0 | 0 | 0 | 0 |
| A+VIII | .14A | 40 | 50 | 40 | 75 | 65 | 25 |
| | 1.12A | 100 | 100 | 100 | 100 | 95 | 100 |
| XI | — | 0 | 0 | 0 | 0 | 0 | 0 |
| A+XI | .14A | 30 | 45 | 40 | 35 | 65 | 0 |
| | 1.12A | 95 | 100 | 80 | 100 | 100 | 100 |

TABLE II

| Compound | Rate kg/ha | CO | SO | WH | SB | FT | CG | NS | LQ | SW |
|---|---|---|---|---|---|---|---|---|---|---|
| A | .14 | 13 | 23 | 15 | 55 | 65 | 53 | 0 | 15 | 20 |
| | 1.12 | 53 | 93 | 58 | 100 | 100 | 98 | 73 | 100 | 100 |
| I | — | 10 | 0 | 10 | 0 | 80 | 0 | 0 | 0 | 0 |
| A+I | .14 | 90 | 100 | 95 | 85 | 100 | 90 | 75 | 100 | 50 |
| | 1.12 | 95 | 100 | 100 | 100 | 100 | 100 | 95 | 100 | 95 |
| VIII | — | 0 | 0 | 25 | 0 | 0 | 0 | 0 | 0 | 0 |
| A+VIII | .14 | 50 | 30 | 45 | 95 | 100 | 100 | 40 | 100 | 45 |
| | 1.12 | 95 | 100 | 85 | 100 | 100 | 100 | 95 | 95 | 90 |

EXAMPLE 4

Following the procedure of Example 1, N-phosphonomethyl glycine, isopropylammonium salt (A) and N-(phosphonomethyl) glycine, 2-ethoxyethyl ester (B) were tested in combination with 2-chlorododecylphosphonic acid (I). The rates on the glycine in the combinations were varied but the synergist was applied at 2.24 kg/ha in each instance.

Plant growth stage at time of treatment:

| Soybeans | (SB) | 1 trif. |
| Cotton | (CO) | 1 leaf |
| Velvetleaf | (VL) | 1½ → 2 leaf |
| Wheat | (WH) | 3 leaf |
| Morningglory | (MG) | 2 leaf |
| Wild Oats | (WO) | 2 leaf |

The test results are shown in Table IV.

TABLE IV

| Compound | Rate kg/ha | SB | CO | VL | WH | MG | WO |
|---|---|---|---|---|---|---|---|
| A | .035A | 0 | 0 | 5 | 0 | 15 | 0 |
| | .07A | 0 | 15 | 23 | 0 | 33 | 0 |
| | .14A | 13 | 20 | 63 | 13 | 55 | 0 |
| | .28A | 25 | 60 | 85 | 33 | 75 | 18 |
| | .56A | 65 | 88 | 95 | 75 | 95 | 33 |
| I | — | 0 | 0 | 0 | 0 | 0 | 0 |
| A+I | .035A | 15 | 50 | 20 | 85 | 55 | 10 |
| | .07A | 75 | 75 | 45 | 90 | 65 | 55 |
| | .14A | 90 | 80 | 80 | 100 | 75 | 25 |
| | .28A | 100 | 80 | 95 | 100 | 90 | 70 |
| B | .035A | 0 | 5 | 5 | 5 | 13 | 0 |
| | .07A | 0 | 8 | 13 | 0 | 40 | 0 |
| | .14A | 8 | 53 | 60 | 18 | 58 | 0 |
| | .28A | 23 | 70 | 75 | 28 | 73 | 5 |
| | .56 | 45 | 83 | 95 | 60 | 83 | 15 |
| I | — | 0 | 0 | 0 | 0 | 0 | 0 |
| B+I | .035A | 5 | 10 | 20 | 80 | 40 | 0 |
| | .07A | 35 | 55 | 45 | 90 | 55 | 40 |
| | .14A | 100 | 95 | 75 | 100 | 80 | 50 |
| | .28A | 95 | 85 | 90 | 100 | 85 | 65 |

EXAMPLE 5

The following Example illustrates that synergistic results are also obtained when the N-phosphonomethyl glycine, isopropylammonium salt and the 2-chlorododecylphosphonic acid are mixed and sprayed on the plants as a water solution. The procedure of Example 1 was followed except that the two chemicals were dissolved in water and sprayed as a mixture. The results are given in Table V.

Plant growth stage at time of treatment:

| soybeans | (SB) | 1 trifoliolate |
| Cotton | (CO) | 1 leaf |
| Velvetleaf | (VL) | 2 leaf |
| Wheat | (WH) | 3 leaf |
| Morningglory | (MG) | 2 leaf |
| Wild Oats | (WO) | 2 → 3 leaf |
| Quackgrass | (QG) | 3 leaf |

TABLE V

| Compound | Rate kg/ha | Percent Inhibition, Avg. 2 Reps. | | | | | | |
|---|---|---|---|---|---|---|---|---|
| | | SB | CO | VL | WH | MG | WO | QG |
| A | .035 | 3 | 0 | 0 | 0 | 18 | 0 | 10 |
| | .07 | 5 | 5 | 0 | 5 | 25 | 0 | 10 |
| | .14 | 3 | 15 | 5 | 5 | 30 | 0 | 10 |
| | .28 | 8 | 43 | 15 | 15 | 55 | 0 | 28 |
| I | 1.12 | 0 | 0 | 0 | 0 | 0 | 10 | 5 |
| A+I | .035A+1.12I | 0 | 33 | 0 | 5 | 25 | 5 | 0 |
| | .07A+1.12I | 3 | 70 | 13 | 20 | 70 | 10 | 28 |
| | .14A+1.12I | 10 | 90 | 53 | 45 | 85 | 23 | 45 |
| | .28A+1.12I | 58 | 93 | 53 | 75 | 95 | 40 | 43 |

EXAMPLE 6

In this Example, the procedure of Example 1 was followed. The N-phosphonomethyl glycine, isopropylammonium salt (A) was treated in combination with synergists:

2-chlorododecylphosphonic acid (I)
1-hydroxydodecylphosphonic acid (XI)
1-hydroxy-1-methylhexadecylphosphonic acid (XVII)
tridecylphosphonic acid (XII)
disodiumdodecylphosphonate (XIII)
disodiumoctadecylphosphonate (XIV) and
dodecylphosphonic acid dimethyl ester (XVIII).

The rates of A were varied but the rates of the synergists I, XI, XVII, XVIII, XII, XIII and XIV were constant at 1.12 kg/ha.

Plant growth stage at time of treatment:

| Soybeans | (SB) | 1½ trifoliolate |
| Cotton | (CO) | 1 leaf |
| Velvetleaf | (VL) | 2 → 2½ leaf |
| Wheat | (WH) | 3 → 4 leaf |
| Morningglory | (MG) | 2 → 3 leaf |
| Wild Oats | (WO) | 2 → 3 leaf |

The results of the tests are given in Table VI.

TABLE VI

| Compound | Rate kg/ha | Percent Inhibition | | | | | |
|---|---|---|---|---|---|---|---|
| | | SB | CO | VL | WH | MG | WO |
| A | .07 | 0 | 15 | 0 | 0 | 20 | 0 |
| | .28 | 13 | 68 | 75 | 33 | 48 | 25 |
| | 1.12 | 73 | 95 | 98 | 73 | 95 | 53 |
| I | — | 0 | 0 | 0 | 0 | 0 | 25 |
| A+I | .07A | 20 | 35 | 35 | 35 | 50 | 45 |
| | .28A | 55 | 60 | 60 | 85 | 65 | 70 |
| | 1.12A | 100 | 90 | 100 | 100 | 100 | 100 |
| XI | — | 0 | 0 | 0 | 0 | 0 | 0 |
| A+XI | .07A | 15 | 50 | 20 | 30 | 30 | 25 |
| | .28A | 35 | 60 | 100 | 80 | 70 | 100 |
| | 1.12A | 90 | 80 | 100 | 95 | 80 | 90 |
| XVII | — | 0 | 0 | 0 | 0 | 0 | 0 |
| A+XVII | .07A | 20 | 40 | 20 | 10 | 25 | 0 |
| | .28A | 70 | 60 | 60 | 30 | 70 | 35 |
| | 1.12A | 100 | 70 | 100 | 100 | 95 | 85 |
| XVIII | — | 10 | 10 | 0 | 25 | 0 | 15 |
| A+XVIII | 0.7A | 20 | 45 | 30 | 15 | 30 | 10 |

TABLE VI-continued

| Compound | Rate kg/ha | SB | CO | VL | WH | MG | WO |
|---|---|---|---|---|---|---|---|
| | .28A | 25 | 55 | 70 | 75 | 65 | 20 |
| | 1.12A | 45 | 75 | 85 | 75 | 65 | 60 |
| XII | — | 0 | 0 | 0 | 0 | 0 | 0 |
| A+XII | .07A | 0 | 55 | 80 | 0 | 55 | 30 |
| | .28A | 40 | 65 | 90 | 80 | 60 | 85 |
| | 1.12A | 60 | 100 | 100 | 85 | 90 | 100 |
| XIII | — | 0 | 0 | 0 | 15 | 0 | 0 |
| A+XIII | .07A | 0 | 10 | 15 | 10 | 20 | 0 |
| | .28A | 35 | 60 | 90 | 75 | 80 | 60 |
| | 1.12A | 100 | 100 | 100 | 100 | 100 | 95 |
| XIV | — | 10 | 0 | 0 | 10 | 0 | 15 |
| A+XIV | .07A | 10 | 15 | 30 | 0 | 25 | 0 |
| | .28A | 30 | 80 | 90 | 20 | 70 | 10 |
| | 1.12A | 95 | 90 | 100 | 85 | 90 | 75 |

EXAMPLE 7

In this Example, the procedure of Example 1 was followed. The N-phosphonomethyl glycine, isopropylammonium salt (A) was tested in combination with:

(p-dodecylbenzyl)phosphonic acid (XIX)
diethyl-1-hydroxydecylphosphonate (XX)
diethyl-1-hydroxydodecylphosphonate (XXI)
hexadecylphosphorodichloridate (XXII)
ethylisopropyldodecylphosphonate (XXIII) and
diethyldodecylphosphonate (XXIV).

The rate of A was varied as shown in the Table, however, the rate of the synergists was maintained constant at 1.12 kg/ha in each instance.

Plant growth stage at time of treatment:

| Soybeans | (SB) | 1½ trifoliolate |
|---|---|---|
| Cotton | (CO) | 1 leaf |
| Velvetleaf | (VL) | 2 leaf |
| Wheat | (WH) | 3 → 4 leaf |
| Morningglory | (MG) | 2 leaf |
| Wild Oats | (WO) | 2 → 3 leaf |

The results are given in Table VII.

TABLE VII

| Compound | Rate kg/ha | SB | CO | VL | WH | MG | WO |
|---|---|---|---|---|---|---|---|
| A | .07 | 0 | 15 | 8 | 0 | 20 | 0 |
| | .28 | 18 | 70 | 85 | 28 | 60 | 20 |
| | 1.12 | 60 | 100 | 100 | 70 | 98 | 70 |
| XIX | — | 0 | 0 | 0 | 0 | 0 | 25 |
| A+XIX | .07A | 0 | 55 | 30 | 0 | 20 | 15 |
| | .28A | 15 | 100 | 100 | 95 | 85 | 40 |
| | 1.12A | 100 | 95 | 100 | 100 | 90 | 95 |
| XX | — | 5 | 10 | 0 | 10 | 0 | 0 |
| A+XX | .07A | 10 | 10 | 5 | 0 | 25 | 40 |
| | .28A | 30 | 20 | 65 | 65 | 60 | 50 |
| | 1.12A | 75 | 90 | 100 | 100 | 90 | 100 |
| XXI | — | 0 | 0 | 0 | 0 | 10 | 10 |
| A+XXI | .07A | 20 | 35 | 15 | 20 | 40 | 60 |
| | .28A | 50 | 70 | 80 | 50 | 60 | 50 |
| | 1.12A | 100 | 100 | 100 | 100 | 80 | 95 |
| XXII | — | 0 | 0 | 0 | 0 | 0 | 0 |
| A+XXII | .07A | 0 | 15 | 10 | 10 | 20 | 25 |
| | .28A | 30 | 100 | 90 | 40 | 45 | 35 |
| | 1.12A | 100 | 90 | 95 | 90 | 85 | 85 |
| XXIII | — | 5 | 10 | 5 | 0 | 5 | 0 |
| A+XXIII | .07A | 5 | 15 | 10 | 15 | 35 | 5 |
| | .28A | 20 | 50 | 50 | 35 | 45 | 35 |
| | 1.12A | 70 | 100 | 100 | 85 | 100 | 100 |
| XXIV | — | 0 | 10 | 0 | 0 | 10 | 0 |
| A+XXIV | .07A | 0 | 20 | 50 | 15 | 25 | 10 |
| | .28A | 30 | 45 | 90 | 35 | 90 | 45 |
| | 1.12A | 70 | 90 | 100 | 90 | 90 | 90 |

WHAT IS CLAIMED IS:

1. A herbicidal composition consisting essentially of an inert diluent and an effective amount of: a glycine compound of the formula

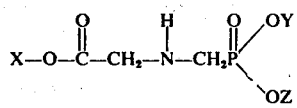

wherein X is lower alkyl, H, lower alkoxyalkyl, lower alkoxyalkoxyalkyl or a salt-forming cation selected from the group consisting of alkali metals, alkaline earth metals, ammonia and amines having a molecular weight below about 300, Y and Z are H or a salt-forming cation as described for X; and a phosphonate compound of the formula

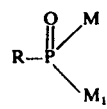

wherein R is an aliphatic hydrocarbon radical of from 1 to 20 carbon atoms or such a radical substituted with halogen, hydroxy or an alkylphenyl group and M and $M_1$ are each hydroxy, chlorine, the same or different lower alkoxy or an alkali metal oxy group.

2. A composition as claimed in claim 1 wherein said glycine compound is an amine salt.

3. A composition as claimed in claim 2 wherein said amine salt is a lower alkyl amine salt.

4. A composition as claimed in claim 3 wherein said alkyl amine salt is an isopropyl amine salt.

5. A composition of claim 4 wherein the phosphonate compound is 2-chlorododecyl phosphonic acid.

6. A herbicidal method which comprises contacting a plant with a herbicidally effective amount of a composition of claim 1.

7. A herbicidal method which comprises contacting a plant with a herbicidally effective amount of a composition of claim 2.

8. A herbicidal method which comprises contacting a plant with a herbicidally effective amount of a composition of claim 3.

9. A herbicidal method which comprises contacting a plant with a herbicidally effective amount of a composition of claim 4.

10. A herbicidal method which comprises contacting a plant with a herbicidally effective amount of a composition of claim 5.

11. A herbicidal method which comprises contacting a plant with a phosphonate compound of the formula

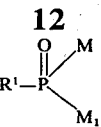

wherein R is an aliphatic hydrocarbon radical of from 1 to 20 carbon atoms or such a radical substituted with halogen, hydroxy or an alkylphenyl group and M and $M_1$ are each hydroxy, chlorine, the same or different lower alkoxy or an alkali metal oxy group, and then sequentially, but substantially, simultaneously with a glycine compound of the formula

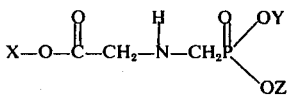

wherein X is lower alkyl, H, lower alkoxyalkyl, lower alkoxyalkoxyalkyl or a salt-forming cation selected from the group consisting of alkali metals, alkaline earth metals, ammonia and amines having a molecular weight below about 300, Y and Z are H or a salt-forming cation as described for X, said phosphonate compound and said glycine compound together providing a herbicidally effective amount.

12. A method of claim 11 wherein said phosphonate compound is 2-chlorododecylphosphonic acid.

13. A method of claim 12 wherein said glycine compound is an amine salt.

14. A method of claim 13 wherein said amine salt is a lower alkyl amine salt.

15. A method of claim 14 wherein said alkyl amine salt is an isopropyl amine salt.

* * * * *